(12) United States Patent
Sano

(10) Patent No.: US 7,774,945 B2
(45) Date of Patent: Aug. 17, 2010

(54) ROTARY ANGLE DETECTING DEVICE

(75) Inventor: Tadashi Sano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 80 days.

(21) Appl. No.: 12/272,082

(22) Filed: Nov. 17, 2008

(65) Prior Publication Data

US 2009/0133271 A1 May 28, 2009

(30) Foreign Application Priority Data

Nov. 22, 2007 (JP) ............... 2007-303081

(51) Int. Cl.
*G01B 7/30* (2006.01)
*G01D 11/24* (2006.01)
(52) U.S. Cl. .................. 33/1 PT; 73/117.02
(58) Field of Classification Search ........... 33/1 PT, 33/1 N, 706–708, 534; 73/117.02; 439/15, 439/164; 180/444
See application file for complete search history.

(56) References Cited

U.S. PATENT DOCUMENTS

| 5,382,172 A | * | 1/1995 | Klier et al. ............... 439/164 |
| 6,298,565 B1 | * | 10/2001 | Weber et al. ............... 33/1 PT |
| 6,341,426 B1 | * | 1/2002 | Okumura ............... 33/1 PT |
| 6,359,432 B1 | * | 3/2002 | Okumura ............... 324/207.2 |
| 6,546,780 B1 | * | 4/2003 | Palfenier et al. ............ 73/1.75 |
| 7,091,474 B2 | | 8/2006 | Sano | |
| 7,256,713 B2 | * | 8/2007 | Sano ............... 341/3 |
| 7,363,826 B2 | * | 4/2008 | Sano ............... 73/862.328 |
| 2006/0272430 A1 | * | 12/2006 | Araki et al. ............ 73/862.321 |

FOREIGN PATENT DOCUMENTS

JP           2006-17663           1/2006

* cited by examiner

*Primary Examiner*—Amy Cohen Johnson
(74) *Attorney, Agent, or Firm*—Brinks Hofer Gilson & Lione

(57) ABSTRACT

A rotary angle detecting device includes a synthetic-resin wheel member which is provided with a shaft hole, into which a steering shaft having a pair of flat surfaces provided in a front end portion thereof is inserted, and a detecting portion and which rotates together with the steering shaft; a sheet-metal attachment member attached to the wheel member and engaged to the steering shaft; a signal detecting unit operable to detect a position variation of the detecting portion accompanied by the rotation of the wheel member; and a housing provided with a through-hole into which the steering shaft is rotatably inserted and accommodating the wheel member and the signal detecting unit.

3 Claims, 4 Drawing Sheets

ROTARY ANGLE DETECTING DEVICE

CROSS REFERENCE TO RELATED APPLICATIONS

"The present invention claims the benefit of and contains subject matter related to Japanese Patent Application JP 2007-303081 filed in the Japanese Patent Office on Nov. 22, 2007, the entire contents of which is incorporated herein by reference."

BACKGROUND

1. Technical Field

The present invention relates to a rotary angle detecting device applied to a rudder angle sensor or the like for a vehicle, and more particularly, to a rotary angle detecting device in which a synthetic-resin wheel member provided with a detecting portion is attached to a steering shaft to rotate together.

2. Related Art

A technique is known in which a rotary angle detecting device is disposed between a vehicle body and a steering shaft of a vehicle, and a deceleration force control of a suspension, a shift position control of an automatic transmission, or a rear-wheel steering control of a four-wheel steering vehicle is carried out on the basis of a steering angle, a steering speed, etc. of a steering wheel detected by the rotary angle detecting device.

In general, in many cases, this kind of rotary angle detecting device includes a rotatable wheel member having a detecting portion such as a code pattern row, a circuit board mounted with a signal detecting element and the like, and a housing (case and cover) accommodating the wheel member and the circuit board and attached to a vehicle body side, wherein the wheel member is attached to the vicinity of the front end portion of a steering shaft so that the wheel member rotates together with the steering shaft upon turning the steering wheel (for example, see U.S. Pat. No. 7,091,474 which corresponds to Japanese Unexamined Patent Publication No. 2006-17663, Pages. 5 to 8, FIG. 1). Likewise, when the wheel member is attached to the vicinity of the steering shaft, it is possible to detect rotary information (a rotary amount or a rotary direction) of the steering shaft in such a manner that a signal detecting element such as a photointerruptor detects a position variation of the code pattern row or the like accompanied by the rotation of the wheel member.

In the rotary angle detecting device in which the wheel member (wheel member 4) having the detecting portion is attached to the steering shaft having a pair of flat surfaces provided in the front end portion thereof, it is necessary to carry out an operation in which a central opening of a cylindrical portion (wheel portion 52) of the wheel member is directly or indirectly fitted to the outside of the front end portion of the steering shaft via an appropriate member. Additionally, it is necessary to hold the wheel member attached to the steering shaft in terms of the attachment operation so as not to be slid or rattled in a rotary direction. For this reason, in the past, the wheel member is press-inserted in an axial direction of the steering shaft to be directly or indirectly strongly fitted thereto during the attachment operation in order for the attached wheel member not to slide or rattle with respect to the steering shaft in a rotary direction. However, since it is necessary to apply a comparatively large press-inserting force to the wheel member during the attachment operation, a problem arises in that workability is very poor.

Additionally, it may be supposed that the strength of the wheel-member-side fitting against the steering shaft is made to be slightly weaker in order to improve the workability of the attachment operation of the wheel member. However, when the wheel-member-side fitting strength is made to be weaker with a general structure, the attached wheel member slides or rattles with respect to the steering shaft in a rotary direction, thereby causing a problem in that it is difficult to obtain satisfactory detection precision.

SUMMARY

A synthetic-resin wheel member which is provided with a shaft hole, into which a steering shaft having a pair of flat surfaces provided in a front end portion thereof is inserted, and a detecting portion and which rotates together with the steering shaft. A sheet-metal attachment member is attached to the wheel member and engaged to the steering shaft. A signal detecting unit operable to detect a position variation of the detecting portion is accompanied by the rotation of the wheel member. A housing is provided with a through-hole into which the steering shaft is rotatably inserted and accommodates the wheel member and the signal detecting unit. The attachment member is provided with a ring portion having an opening through which the front end portion of the steering shaft is inserted and a pair of tongue pieces extending toward the inside of the shaft hole from an inner peripheral surface located at the opening of the ring portion and opposed to the pair of flat surfaces. A bent portion is provided between a front end portion on a free end side and a base end portion of each of the pair of tongue pieces, and the bent portion is set such that an opposed interval between both bent portions is smaller than that between the pair of flat surfaces and an opposed interval between the front end portions of the pair of tongue pieces is larger than that between the pair of flat surfaces in order that the attachment member is engaged to the pair of flat surfaces in a line contact state upon being attached to the steering shaft.

With such a configuration, when the wheel member is press-inserted in an axial direction of the steering shaft so that the front end portion of the steering shaft is inserted into the shaft hole of the wheel member, the pair of tongue pieces comes into contact with the front end portion of the steering shaft. When the front end portion of the steering shaft is further inserted, the pair of tongue pieces are bent outward while being enlarged to thereby generate an elastic repulsive force, thereby enabling the bent portion of the tongue piece to come into press-contact with the pair of flat surfaces of the steering shaft in a line contact state when the wheel member is attached to the steering shaft. Accordingly, even when the press-contact force is not particularly large, the attachment member is securely engaged and held to the steering shaft so as not to be slid or rattled in a rotary direction. Accordingly, the wheel member held to the steering shaft via the attachment member is not slid or rattled in a rotary direction, thereby obtaining satisfactory rotary angle detection precision without deterioration. Also, it is not necessary to apply an excessive press-inserting force during the attachment operation in which the wheel member is press-inserted in an axial direction of the steering shaft. As a result, it is possible to remarkably improve the workability.

DESCRIPTION OF EXEMPLARY EMBODIMENTS

Figure 1:
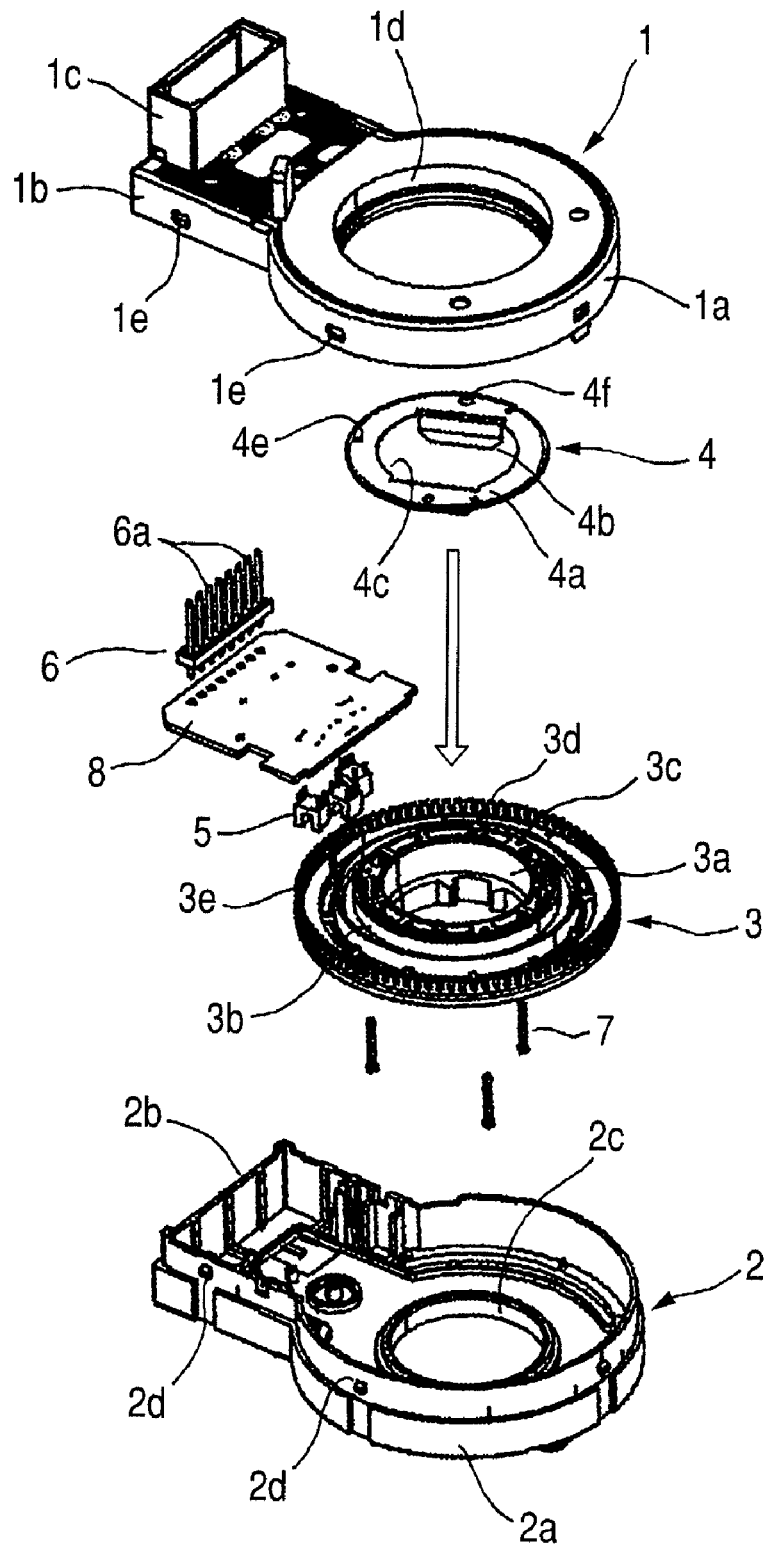
FIG. 1 is an exploded perspective view showing a rotary angle detecting device according to an embodiment of the invention.
Figure 2:
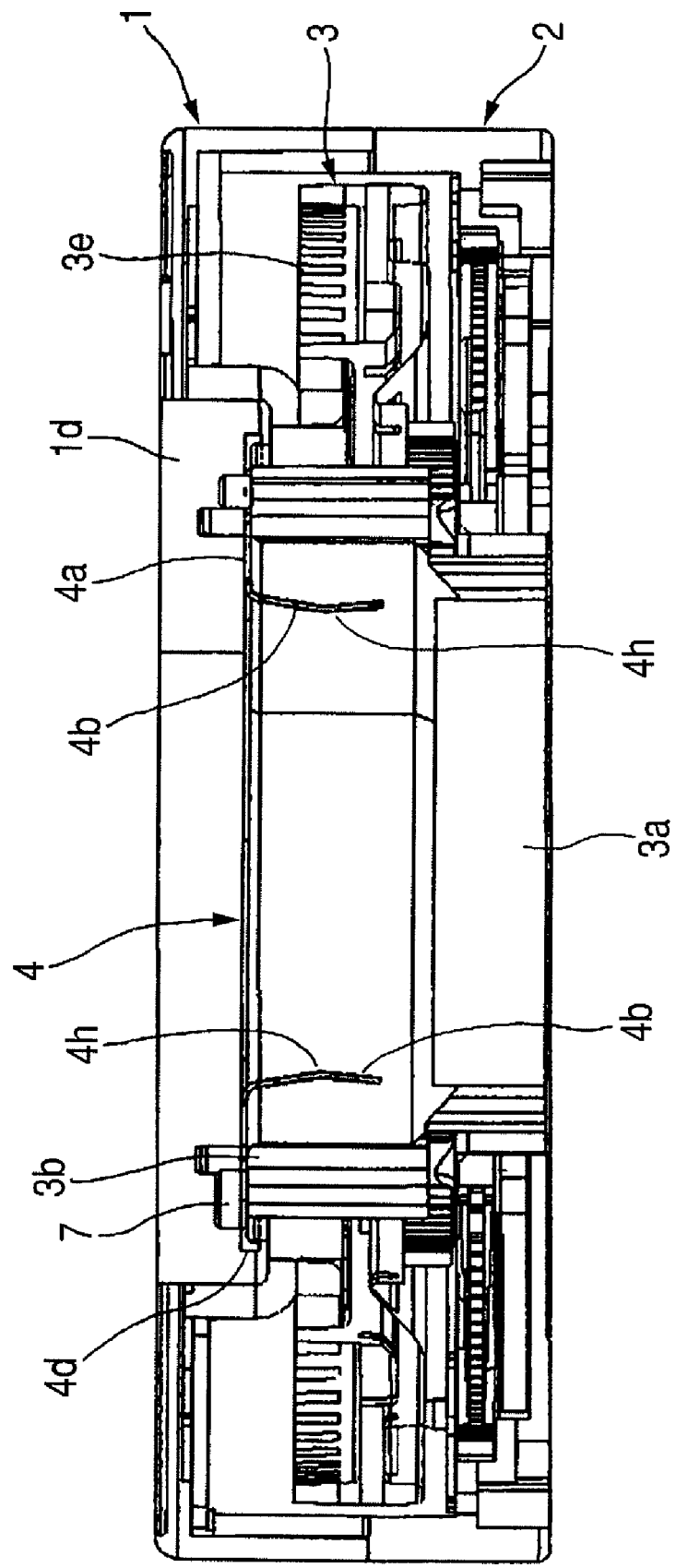
FIG. 2 is a sectional view showing a state where the rotary angle detecting device shown in FIG. 1 is assembled.
Figure 3:
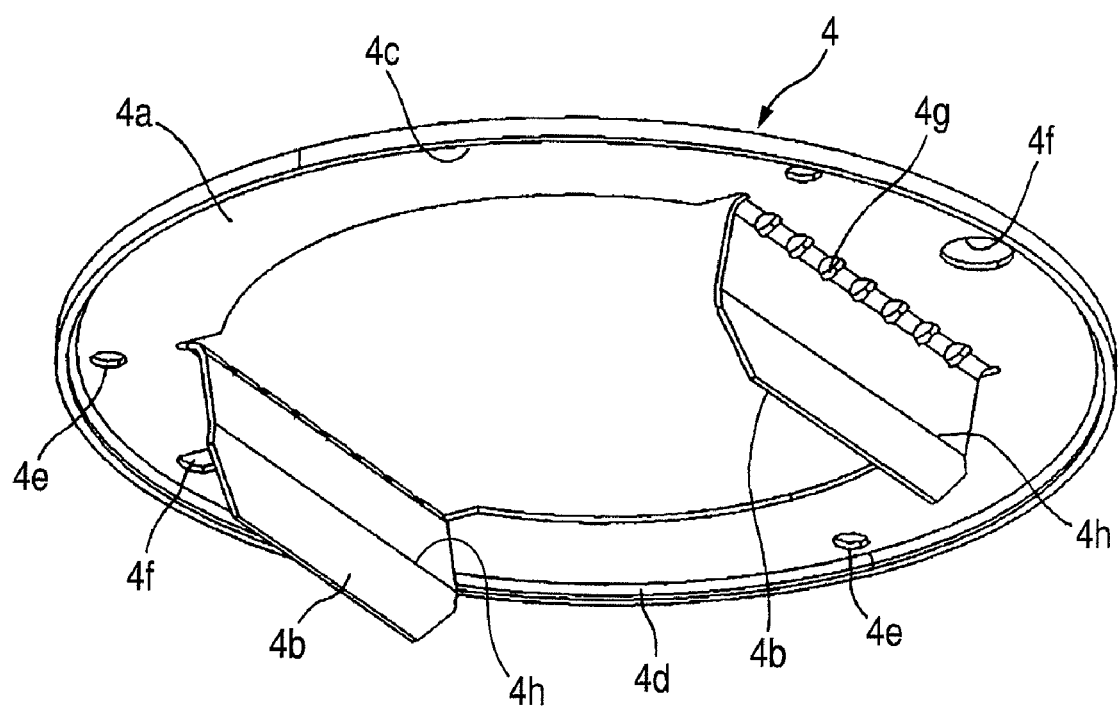
FIG. 3 is an enlarged perspective view showing an attachment member used in the rotary angle detecting device shown in FIG. 1.
Figure 4:
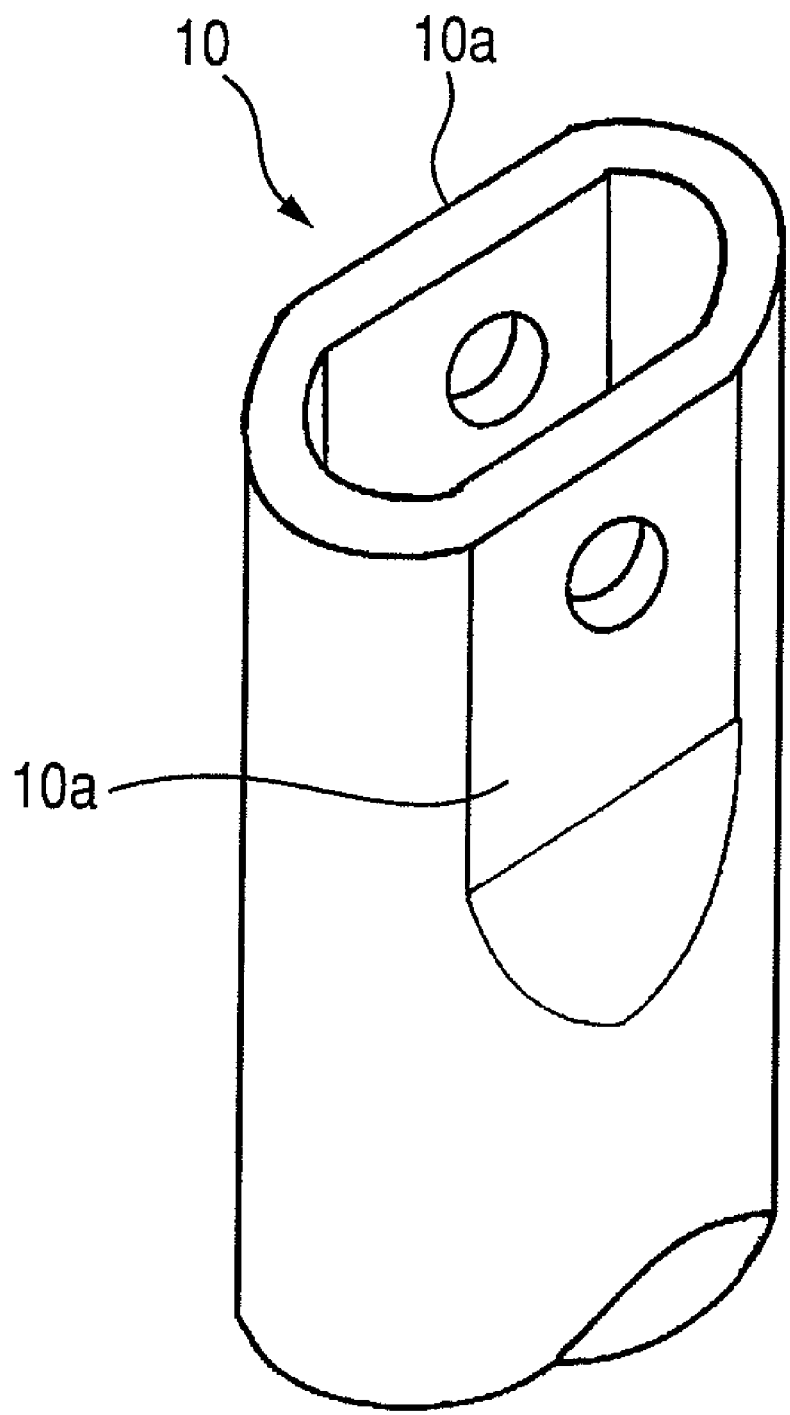
FIG. 4 is a perspective view showing a shape of a front end portion of a steering shaft attached with a rotor portion of the rotary angle detecting device according to the embodiment of the invention.

An exemplary embodiment of the invention will be described with reference to the accompanying drawings. FIG. 1 is an exploded perspective view showing a rotary angle detecting device according to an embodiment of the invention. FIG. 2 is a sectional view showing a state where the rotary angle detecting device shown in FIG. 1 is assembled. FIG. 3 is an enlarged perspective view showing an attachment member used in the rotary angle detecting device shown in FIG. 1. FIG. 4 is a perspective view showing a shape of a front end portion of a steering shaft attached with a rotor portion of the rotary angle detecting device according to the embodiment of the invention.

The rotary angle detecting device shown in FIGS. 1 and 2 is used to detect rotary information (a rotary amount, a rotary direction, and the like) of a steering shaft 10 (see FIG. 4) of a vehicle, where a case 1 and a cover 2 constituting a housing are attached to a vehicle body side, and a wheel member 3 as a rotor portion is attached to the front end portion of a steering shaft 10 via an attachment member 4. Then, a signal detection element 5 detects the rotary information of the wheel member 3 rotating together with the steering shaft 10, and the detection signal is output to the outside via a connector pin 6. Additionally, as shown in FIG. 4, a pair of flat cut surfaces (flat surfaces) 10a is formed in the outer peripheral surface of the front end portion of the steering shaft 10.

The wheel member 3 is made from synthetic resin. The center portion thereof is provided with a shaft hole 3a to which the steering shaft 10 is inserted, and a cylindrical portion 3b surrounds the shaft hole 3a. Attachment holes 3c are respectively provided at three positions of the cylindrical portion 3b so that a rivet 7 (see FIG. 1) is inserted therethrough, and a pair of positioning protrusions 3d is provided in a top surface in a protruding manner. The outer peripheral portion of the wheel member 3 is provided with a code pattern row 3e constituted by a slit row as a detecting object. The wheel member 3 is integrally formed with the attachment member 4 formed by a sheet metal, and is attached to the steering shaft 10.

The attachment member 4 is made by a sheet metal processing, and includes an annular ring portion 4a and a pair of wide tong pieces 4b. The center portion of the ring portion 4a is provided with an opening 4c through which the steering shaft 10 is inserted, and the whole outer peripheral surface of the ring portion 4a is provided with a jetty portion 4d in a circumferential direction by drawing. The opening 4c is substantially formed into the same shape as the sectional shape of the front end portion of the steering shaft 10 provided with the cut surfaces 10a. Also, the opening 4c has a dimension in which the front end portion of the steering shaft 10 is inserted. Attachment holes 4e are respectively punched at three positions of the ring portion 4a at an interval of 120° in a circumferential direction so that the rivet 7 is inserted therethrough. Positioning holes 4f having different shapes are respectively punched at two positions thereof at an interval of 180° so that the pair of positioning protrusions 3d of the wheel member 3 is inserted therethrough. The pair of tongue pieces 4b is a bent piece extending toward the inside of the shaft hole 3a of the cylindrical portion 3b from two positions of the inner peripheral surface located at the opening 4c and opposed to the cut surfaces 10a of the steering shaft 10. Since the ring portion 4a is fixed by caulking onto the cylindrical portion 3b of the wheel member 3 by the use of three rivets 7, as shown in FIG. 2, the attachment member 4 is incorporated into the wheel member 3 in a state where the pair of tongue pieces 4b is disposed in the inside of the shaft hole 3a. As it is understood from FIG. 3, the base end portion (a portion opposed to each cut surface 10a and bent with respect to the ring portion 4a) of each tongue piece 4b is provided with a plurality of through-holes 4g. A bent portion 4h bent at a dull angle is provided between the front end portion on the free end side and the base end portion of each tongue piece 4b.

The pair of tongue pieces 4b is an elastic piece coming into press-contact with the cut surface 10a of the front end portion of the steering shaft 10 in a line contact state. However, as shown in FIG. 2, in a non-attachment state not coming into press-contact with the steering shaft 10, an opposed interval between the bent portions 4h of both tongue pieces 4b is set to be smaller than an opposed interval of the cut surfaces 10a of the steering shaft 10. Additionally, an opposed interval of the front end portions of the pair of tongue pieces 4b is set to be larger than the opposed interval between the cut surfaces 10a of the steering shaft 10. Further, the whole outer peripheral surface of the ring portion 4a is provided with the jetty portion 4d in a circumferential direction by drawing so that the attachment member 4 is fitted to the wheel member 3. Accordingly, rigidity of the ring portion 4a is improved. As a result, when the attachment member 4 is fitted to the wheel member 3, it is possible to prevent a case in which the ring portion 4a is unexpectedly deformed by a repulsive force generated when the tongue pieces 4b come into press-contact with the steering shaft 10.

The case 1 is made from synthetic resin, and includes an annular portion 1a for defining a ring-shaped space, a rectangular portion 1b extending outward from the annular portion 1a in a radial direction, and a connector connection portion 1c provided upright in the rectangular portion 1b, where the front end portion of the steering shaft 10 is rotatably inserted into a through-hole 1d surrounded by the annular portion 1a. Locking holes 1e are provided at a plurality of positions of an outer wall surface of the annular portion 1a so that the cover 2 is snap-attached. A circuit board 8 described below is disposed in the inside of the rectangular portion 1b. An external connector (not shown) is inserted to the connector connection portion 1c.

The cover 2 is made from synthetic resin, and includes an annular portion 2a having the same shape as that of the annular portion 1a of the case 1, and a rectangular portion 2b having the same shape as that of the rectangular portion 1b of the case 1, where the front end portion of the steering shaft 10 is rotatably inserted to a through-hole 2c surrounded by the annular portion 2a. Additionally, locking claws 2d are provided at a plurality of positions of an outer wall surface of the annular portion 2a so as to correspond to the locking holes 1e. When the locking claws 2d snap-engage with the locking holes 1e, the cover 2 is snap-attached to the case 1 to thereby constitute the housing. The wheel member 3 is rotatably accommodated in a space covered by the annular portion 1a and the annular portion 2a of the housing, and the signal detection element 5 or the circuit board 8 is accommodated in a space covered by the rectangular portion 1b and the rectangular portion 2b of the housing.

A circuit pattern (not shown) is formed on a surface of the circuit board 8. Additionally, the circuit board 8 is mounted with a plurality of signal detection elements 5, the connector pin 6, an electric component (not shown), or the like. The signal detection element 5 is a photointerruptor in which a light-receiving element and a light-emitting element are combined to be opposed to each other, where the light-receiving element and the light-emitting element are respectively disposed on the inner peripheral side and the outer peripheral side of the code pattern row (slit row) 3e of the wheel member 3. Accordingly, the signal detection element 5 is capable of detecting a variation in position of the code pattern row 3e in accordance with the rotation of the wheel member 3. A predetermined number of external connector connecting pins 6a are provided in a row in the connector pin 6. When the front end portions of the pins 6a are disposed in the inside of the connector connection portion 1c of the case 1, it is possible to attach or detach the external connector (not shown).

Next, a sequence upon attaching the wheel member 3 to the steering shaft 10 via the attachment member 4 will be described. First, as described above, the ring portion 4a of the attachment member 4 is fixed by caulking onto the cylindrical portion 3b of the wheel member 3, and the attachment member 4 is incorporated into the wheel member 3 in a state where the pair of tongue pieces 4b opposed to each other is disposed in the inside of the shaft hole 3a. Subsequently, the wheel member 3 is pressed-inserted in an axial direction of the steering shaft 10 so that the front end portion of the steering shaft 10 is inserted into the inside of the shaft hole 3a of the incorporated member in a direction from a surface opposite to the top surface (a surface attached with the attachment member 4) of the wheel member 3 toward the top surface of the wheel member 3. At this time, an operation is carried out in which the pair of cut surfaces 10a provided in the outer peripheral surface of the front end portion of the steering shaft 10 is press-inserted between the pair of tongue pieces 4b while being positioned therebetween. In such a press-inserting operation, since both tongue pieces 4b is set such that the opposed interval between the front end portions is larger than the opposed interval between the pair of cut surfaces 10a of the steering shaft 10 and the opposed interval between the bent portions 4h is smaller than the opposed interval between the cut surfaces 10a of the steering shaft 10, when the front end portion of the steering shaft 10 is press-inserted into the wheel member 3 while coming into contact with the front end portions and the bent portions 4h of both tongue pieces 4b, both tongue pieces 4b are bent outward while being enlarged by the steering shaft 10, thereby generating an elastic repulsive force and increasing the elastic repulsive force. Subsequently, as the steering shaft 10 is further inserted into the shaft hole 3a, a flat portion between the bent portion 4h and the base end portion of each tongue piece 4b comes into press-contact with the corresponding cut surface 10a in a line contact state, thereby enabling the attachment member 4 to be attached to the front end portion of the steering shaft 10. Accordingly, even when the press-contact force is not particularly large, the attachment member 4 is securely engaged and held to the front end portion of the steering shaft 10, and thus the attachment member 4 rotates together with the steering shaft 10 in a rotary direction without sliding or rattling. As a result, the wheel member 3 attached to the front end portion of the steering shaft 10 via the attachment member 4 rotates together with the steering shaft 10 in a rotary direction without sliding or rattling.

As described above, in the rotary angle detecting device according to the embodiment of the invention, the sheet-metal attachment member 4 having the ring portion 4a and the tongue pieces 4b is fixed to the cylindrical portion 3b of the wheel member 3 to be incorporated thereinto, the wheel member 3 is press-inserted in an axial direction of the steering shaft 10 so that the front end portion of the steering shaft 10 is inserted into the shaft hole 3a, and then the pair of tongue pieces 4b comes into press-contact with the pair of flat cut surfaces 10a of the steering shaft 10 in a line contact state, thereby attaching the wheel member 3 to the steering shaft 10. Likewise, if the pair of tongue pieces 4b opposed to each other comes into press-contact with the pair of cut surfaces 10a of the steering shaft 10 in a line contact state, even when the press-contact force is not particularly large, the attachment member 4 is securely engaged and held to the steering shaft 10 without sliding and rattling in a rotary direction. Accordingly, the wheel member 3 is held to the steering shaft 10 via the attachment 4 without sliding or rattling in a rotary direction, thereby ensuring satisfactory detection precision without deteriorating rotary angle detection precision. Additionally, since it is not necessary to set particularly large press-contact force of the tongue pieces 4b against the steering shaft 10, it is not necessary to apply an excessive press-inserting force during an attachment operation in which the wheel member 3 is press-inserted in an axial direction of the steering shaft 10. Accordingly, it is possible to remarkably improve the workability.

Further, like the example according to the embodiment, when one or more through-holes 4g are provided in the base end portion of the tongue piece 4b of the attachment member 4, it is desirable in that it is possible to facilitate the bending process for forming the tongue piece 4b and to easily adjust the elastic repulsive force generated in the tongue piece 4b by appropriately selecting the number or size of the through-hole 4g.

Furthermore, like the example according to the embodiment, when the jetty portion 4d is provided by drawing in the whole outer peripheral surface of the ring portion 4a of the attachment member 4 in a circumferential direction, it is desirable in that it is possible to increase the rigidity of the ring portion 4a and thus to prevent a case in which the ring portion 4a is unexpectedly deformed by a repulsive force generated when the tongue piece 4b comes into press-contact with the steering shaft 10.

It should be understood by those skilled in the art that various modifications, combinations, sub-combinations and alterations may occur depending on design requirements and other factors insofar as they are within the scope of the appended claims of the equivalents thereof.

What is claimed is:

1. A rotary angle detecting device comprising:
   a synthetic-resin wheel member which is provided with a shaft hole, into which a steering shaft having a pair of flat surfaces provided in a front end portion thereof is inserted, and a detecting portion and which rotates together with the steering shaft;
   a sheet-metal attachment member attached to the wheel member and engaged to the steering shaft;
   a signal detecting unit operable to detect a position variation of the detecting portion accompanied by the rotation of the wheel member; and
   a housing provided with a through-hole into which the steering shaft is rotatably inserted and accommodating the wheel member and the signal detecting unit,
   wherein the attachment member is provided with a ring portion having an opening through which the front end portion of the steering shaft is inserted and a pair of tongue pieces extending toward the inside of the shaft hole from an inner peripheral surface located at the opening of the ring portion and opposed to the pair of flat surfaces, wherein a bent portion is provided between a front end portion on a free end side and a base end portion of each of the pair of tongue pieces, and wherein the bent portion is set such that an opposed interval between both bent portions is smaller than that between the pair of flat surfaces and an opposed interval between the front end portions of the pair of tongue pieces is larger than that between the pair of flat surfaces in order that the attachment member is engaged to the pair of flat surfaces in a line contact state upon being attached to the steering shaft.

2. The rotary angle detecting device according to claim 1, wherein one or more through-holes are provided in the base end portions of the pair of tongue pieces.

3. The rotary angle detecting device according to claim 1, wherein a jetty portion is provided by drawing in a whole outer peripheral surface of the ring portion in a circumferential direction.

* * * * *